United States Patent Office 3,281,572
Patented Oct. 25, 1966

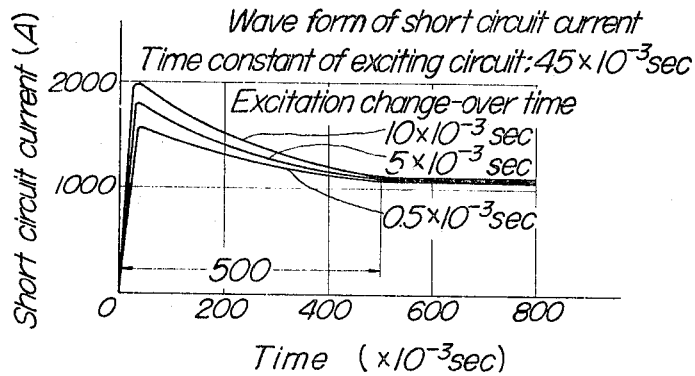
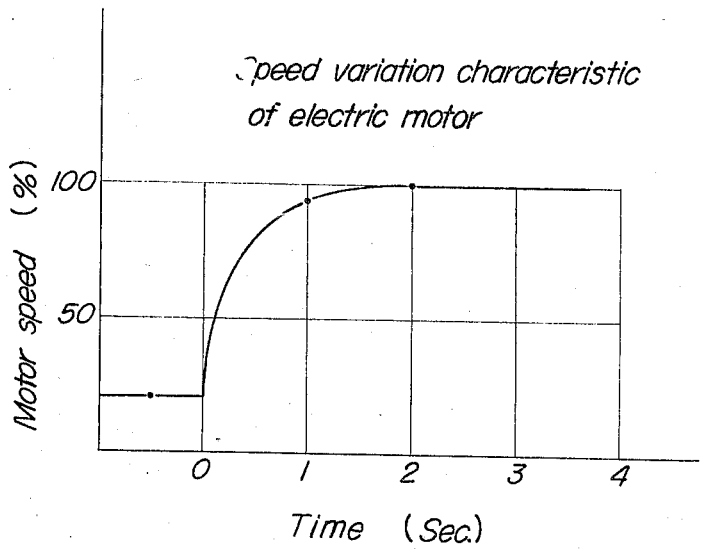

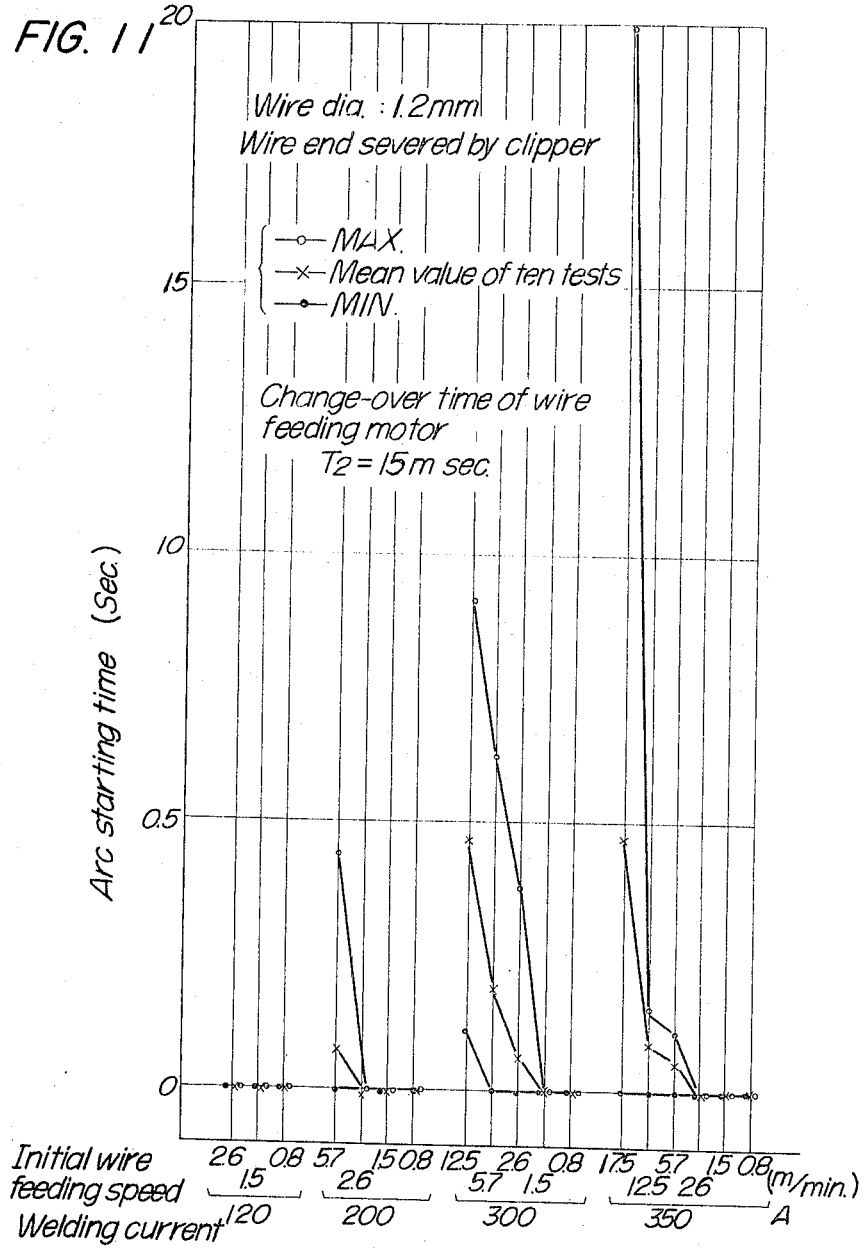

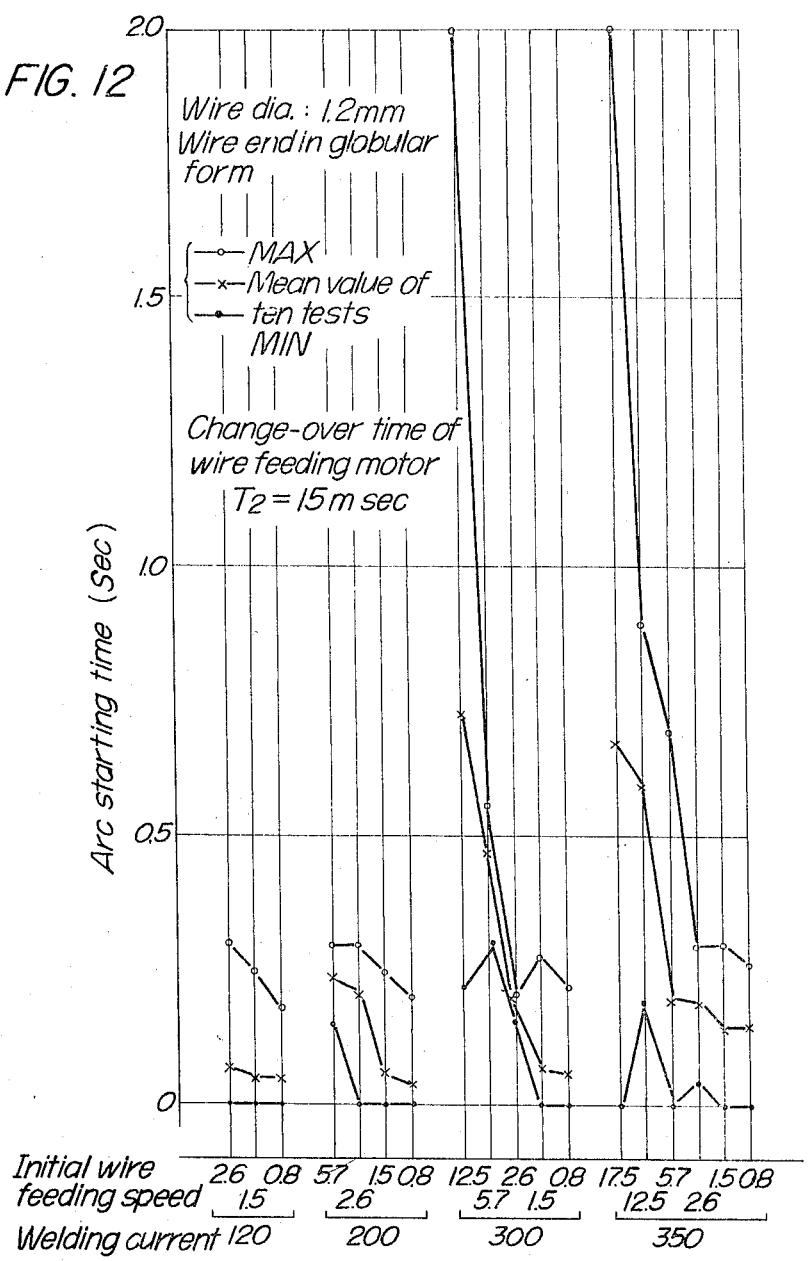

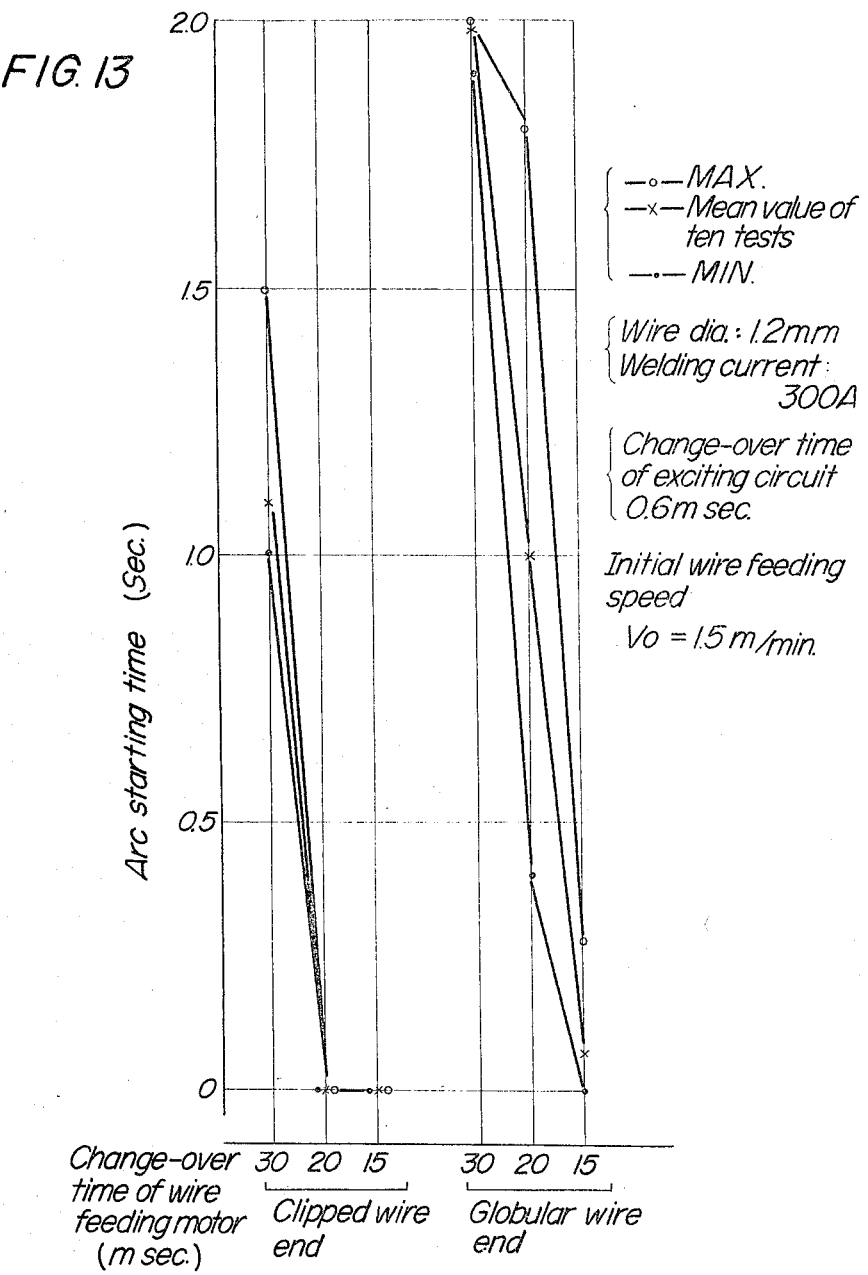

3,281,572
ARC WELDING EQUIPMENT
Takeshi Oku and Takashi Shibano, Suita-shi, Japan, assignors to Matsushita Electric Industrial Co., Ltd., Osaka, Japan, a corporation of Japan
Filed Feb. 1, 1965, Ser. No. 429,269
Claims priority, application Japan, Apr. 14, 1964, 39/21,376
2 Claims. (Cl. 219—131)

The present invention relates to automatic welding equipment adapted for operation with continuously consumable electrodes.

In automatic arc welding employing a continuously consumable electrode, the arc starting characteristic exerts a considerably large influence on the facility of welding operation. Especially in gas shielded arc welding employing a D.C. power source having a constant voltage characteristic or a rising characteristic and employing a shielding gas such as carbon dioxide gas, argon or a mixture of other gases, such arc starting characteristic exerts an important influence on the welding operation and in addition to the above, a bad arc starting characteristic induces various troubles such as bad appearance at a starting portion of weld beads, fouling of the welding torch due to extremely unstable arcing at the time of striking the arc and adhesion of the electrode wire to a conducting tip.

Therefore, the primary object of the present invention is to provide an arc welding device of the type described above which is free from prior drawbacks and is provided with a markedly improved arc starting characteristic.

According to the present invention, there is provided an arc welding device for operation with a consumable electrode comprising welding power supply means operative to provide in the initial stage of welding a welding current with a rise rate $di/dt$ (mean value in 10 milliseconds after initiation of short circuit) of more than $50 \times 10^3$ amperes per second and to supply a short circuit current with a peak value $I_s$ of more than 1000 amperes, said welding power supply means being restored to its normal steady operative state with a time lag $T_1$ of less than $120 \times 10^{-3}$ seconds after striking an arc, and welding wire feeding means operative to give in the initial stage of welding a wire feeding speed $V_0$ of less than 3 meters per minute and restored to its normal steady operative state with a time lag $T_2$ of less than $20 \times 10^{-3}$ seconds after striking an arc to get a normal steady feeding speed, the change-over from the initial to the normal steady speed being effected at a speed variation rate $dv/dt$ of more than 0.8% per $10^{-3}$ second ($dv/dt$ being a mean value in 20 milliseconds after the change-over of speed assuming that the normal steady speed is 100%).

According to the present invention, there is also provided an arc welding device for operation with a consumable electrode comprising means for detecting short circuit current, a switching circuit operative in response to a signal from said detecting means to deliver an output signal, welding power supply means including a saturable reactor whose state of excitation is variable in response to the output signal from said switching circuit, and welding wire feeding means whose wire feeding speed is variable in response to the output signal from said switching circuit; said arc welding equipment being operative in a manner that said welding power supply means provides in the initial stage of welding a welding current with a rise rate $di/dt$ (mean value in 10 milliseconds after initiation of short circuit) of more than $50 \times 10^3$ amperes per second, supplies a short circuit current with a peak value $I_s$ of more than 1000 amperes and is restored to its normal steady operative state with a time lag $T_1$ of less than $120 \times 10^{-3}$ second after striking of arc, and said welding wire feeding means gives in the initial stage of welding a wire feeding speed $V_0$ of less than 3 meters per minute and is restored to its normal steady operative state with a time lag $T_2$ of less than $20 \times 10^{-3}$ seconds after striking an arc to get a normal steady feeding speed, the change-over from the initial to the normal steady speed being effected at a speed variation rate $dv/dt$ of more than 0.8% per $10^{-3}$ second ($dv/dt$ being a mean value in 20 milliseconds after the change-over of speed assuming that the normal steady speed is 100%).

There are other objects and particularities of the present invention which will become obvious from the following description with reference to the accompanying drawings, in which:

FIGS. 7 to 10 are graphic illustrations of wave forms of short circuit current in the arc welding equipment of FIG. 6;

FIGS. 11 to 13 are graphic representations of an arc starting characteristic in the arc welding equipment of FIG. 6;

FIG. 14 is a graphic representation of the variation of rate of speed of the electric motor with relation to time also in the equipment of FIG. 6;

Hitherto, any extensive investigation has hardly been made for the elucidation of the manner of arc striking for the purpose of improving the arc starting characteristic. The various measures so far employed have been based on what has been obtained from empirical phenomena, but all of these measures have failed to provide a sufficiently satisfactory result. Or more precisely, the following methods have been proposed in an effort to improve the arc starting characteristic.

(1) A method of supplying an excessively heavy current at the time of arc striking.

This method was adopted in arc welding devices disclosed in Japanese patent publication No. 18,084/1963 and Japanese patent publication No. 18,085/1963. According to this method, before arc striking, a constant D.C. voltage is supplied to an exciting circuit of a saturable reactor in the negative direction, and with the arc striking the sum of the D.C. voltage and a voltage at the output terminals is applied to excite the reactor also in the negative direction to thereby obtain an excessively heavy current at the time of arc striking. Although this method has proved considerably effective, this method can not provide a sufficiently satisfactory result as will be described later.

(2) A method of feeding a welding wire at low speed at the time of arc striking and changing the speed to a higher normal steady speed as soon as the arc is struck.

This method has been widely used with the MIG arc welding in which a power source with drooping characteristics is employed to supply a welding current. However, this method is hardly effective for use with, for example, carbon dioxide gas shielded arc welding employing a constant D.C. voltage source as will be described later.

In an effort to improve the arc starting characteristic, the inventors have made many experiments under various conditions and as a result thereof have inductively found that the basic conditions necessary for obtaining an improved arc starting characteristic should be as described below:

(1) Contact resistance between a wire and a base metal should vary at a sufficiently slow rate with relation to time from the instant at which the wire contacts the base metal, and a sufficiently heavy short circuit current having a suitable rise rate should be supplied while the contact resistance between the wire and the base metal is sufficiently higher than a contact resistance between a conductive tip and the wire as well as a specific resistance of the wire per se.

(2) Transient phenomena developed during the above-described period after the arc striking should terminate and transfer to the normal steady state within a sufficiently short period.

Figure 1:
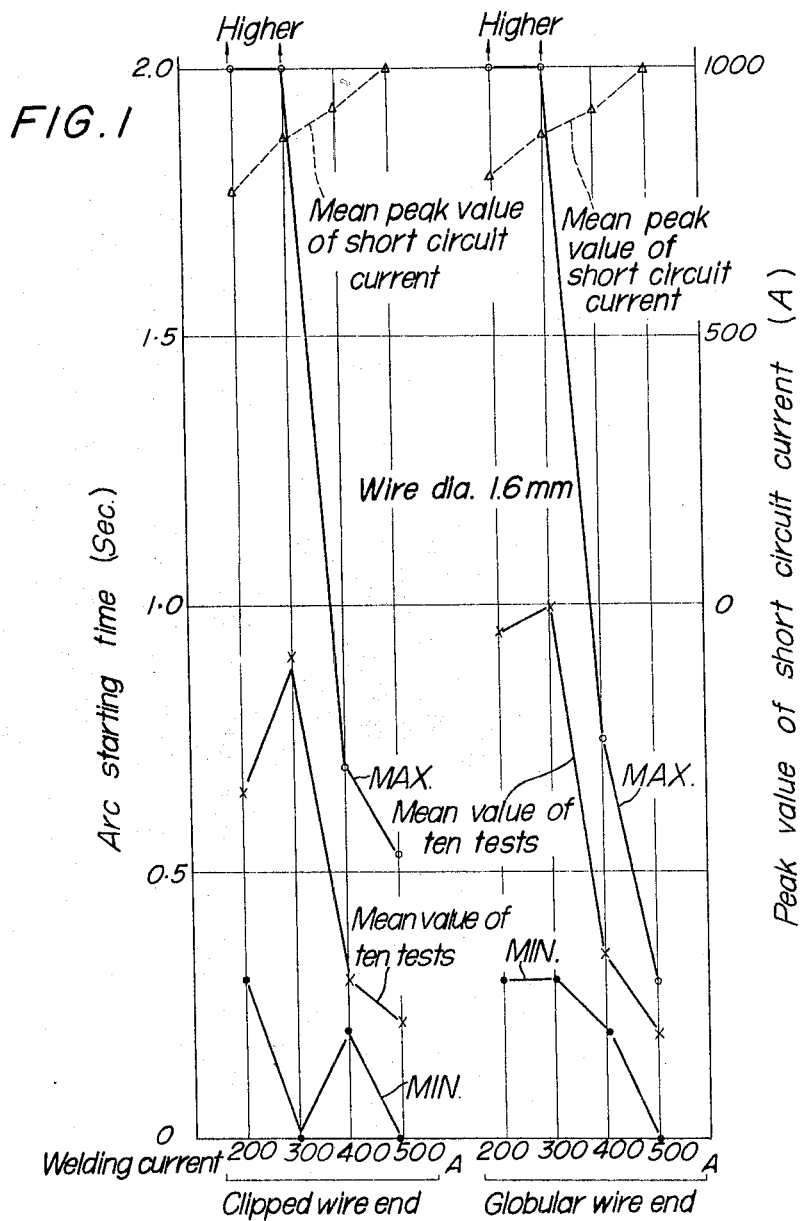
FIGS. 1 to 4 are graphic representations of an arc starting characteristic in prior arc welding equipment.
Figure 2:
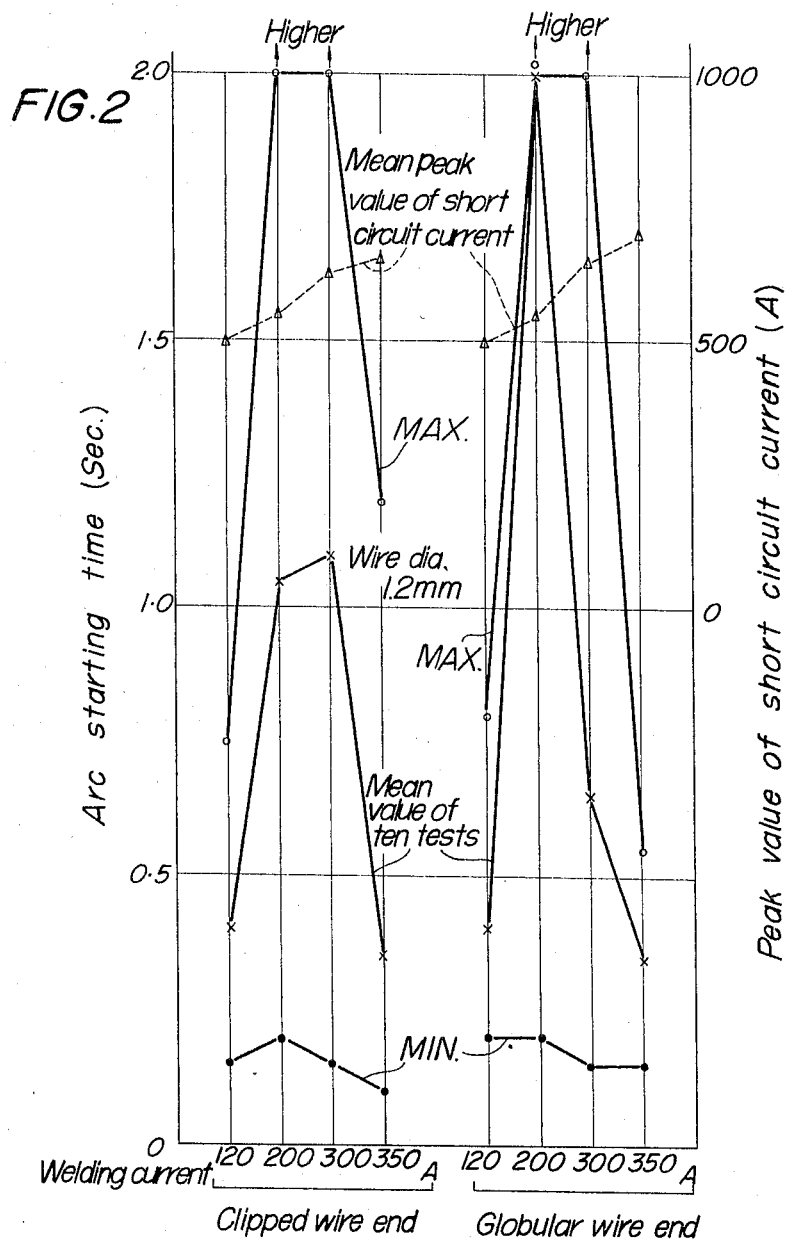

It will be observed that, whenever an arc is started by the prior methods, wires about 5 to 15 millimeters long severed by fusion stick to a starting portion of weld bead or beside it. This means that the wire is not severed by fusion at a point of contact of the wire with a base metal when the wire is brought into contact with the base metal, but the wire is severed at a position near a point of contact of the wire with a conductive tip or at a position intermediate the wire tip and the conductive tip means. In such a case, the arc starting characteristic is quite poor and an arc starting time of more than 2 seconds may be required as shown in FIGS. 1 and 2 representing the results of arc starting tests with wire diameters of 1.6 and 1.2 millimeters, respectively.

Figure 3:
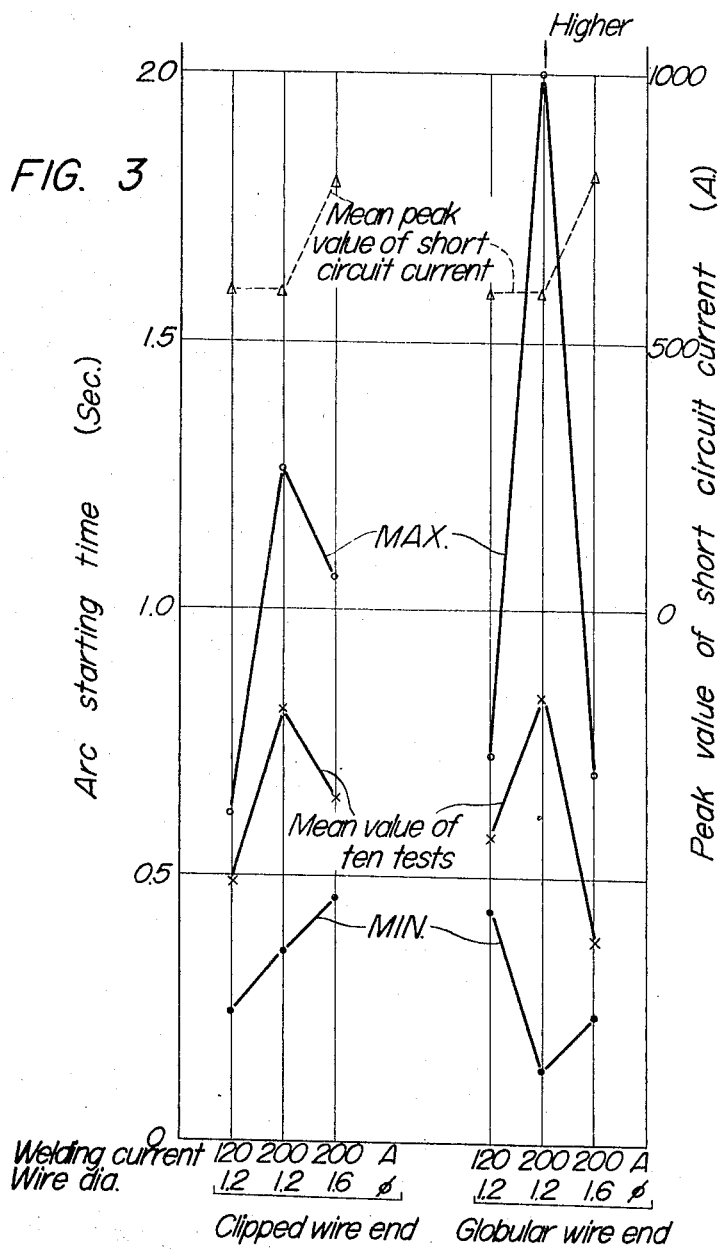

Slowing down the rate of variation of contact resistance with relation to time is intended to cause the wire to sever by fusion at a point of contact of the wire with a base metal. When a slow variation rate of contact resistance is combined with a prior welding current supply source to which no special attention is given with respect to a rate of current increase at the moment of short circuit, a satisfactory arc starting characteristic can not be obtained as shown in FIG. 3 representing a series of arc starting tests with wires of 1.2 and 1.6 millimeters in diameter.

In the method of supplying an excessively heavy current at the time of arc striking as disclosed in the aforedescribed Japanese Patent Publication No. 18,084/1963 and Japanese Patent Publication No. 18,085/1963, a satisfactory arc starting characteristic is achieved only under the limited conditions of welding current source circuit, under the limited welding conditions in respect of values of welding current, wire diameter, etc. and under the limited wire condition that the tip is cut cleanly as by a clipper. However, this satisfactory arc starting characteristic is not always obtained under all range of welding conditions and under some conditions of the wire tip.

Figure 4:
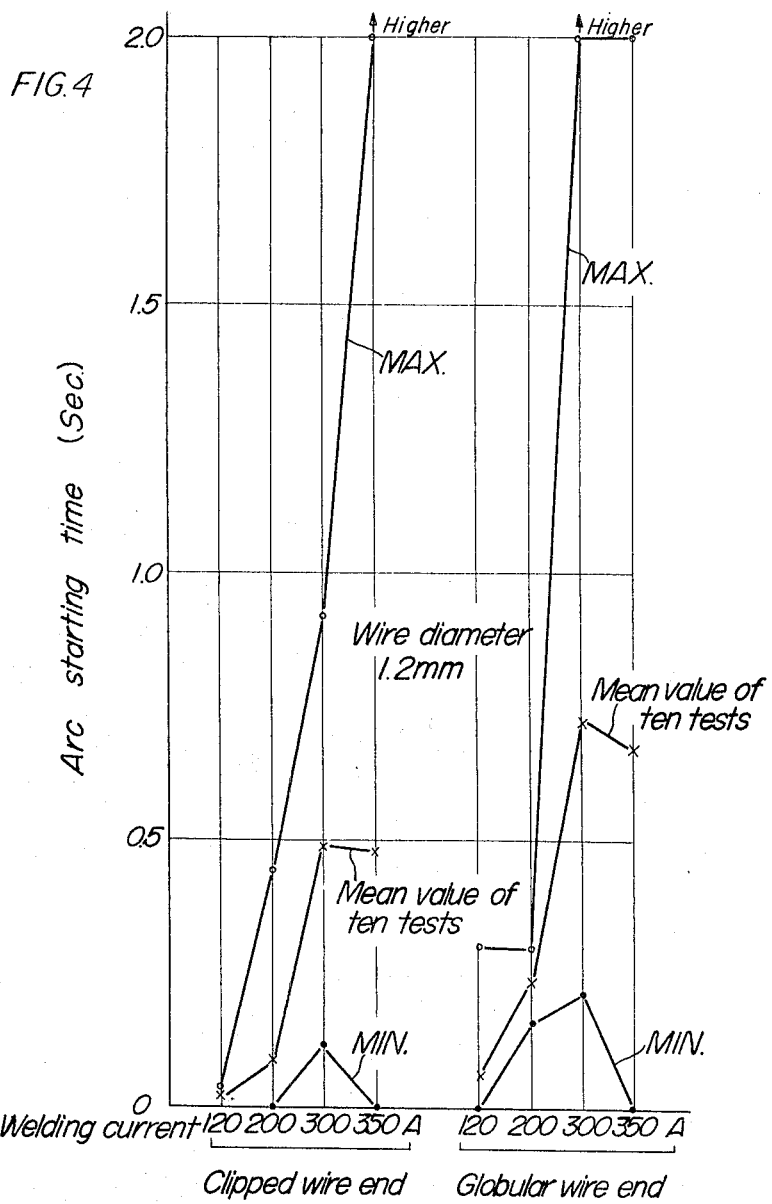

Or more precisely, the above-described method provides a satisfactory arc starting characteristic under proper conditions of a welding current source circuit, at a welding current of 120 to 200 amperes in case of carbon dioxide gas shielded arc welding, and under the condition of the wire tip cut cleanly as by a clipper. But such satisfactory characteristic is not obtained under the conditions of the wire tip of a globular shape formed by fusion, as shown in FIG. 4.

Figure 5:
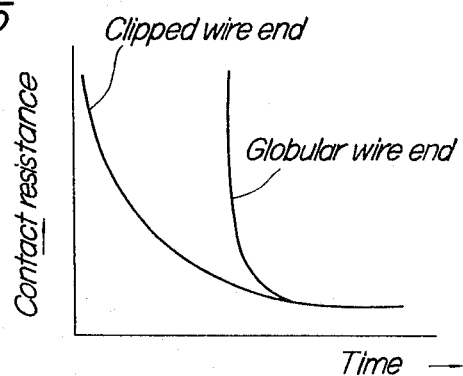
FIG. 5 is a graphic representation of variation of contact resistance between a wire and a base metal with relation to time.

When the wire tip takes such a globular shape, slag on the surface of the globular forms a thin electrically insulating film, and even after the wire tip is brought into contact with a base metal, the point of contact therebetween is kept in an electrically insulated state due to the presence of the insulating film, which prevents current from flowing therethrough until the contact pressure becomes large enough by the force of feeding the wire. As the contact pressure becomes large enough, the above-described electrically insulating film is destroyed to permit the current flow through the contact point, but the contact resistance thereat varies extremely abruptly with relation to time as shown in FIG. 5. It is considered that, in the case of such a globular wire tip, the portion of wire tip in contact with the base metal is insufficiently fused and a poor arc starting characteristic is obtained even though the short circuit current has a sufficiently high rise rate, because sufficiently high contact resistance appears only in an extremely short period.

The difficulty as described above can be solved by the method disclosed in the basic condition (1), or more concretely, by limiting an initial speed of wire feed below a certain value in order to slow down the rate of variation of contact resistance with relation to time and by initially exciting a welding voltage controlling a saturable reactor of the power source in the positive state so that the welding current having a sufficiently high rise rate can be supplied at the moment of short circuit. This basic condition (1) is not sufficient to get a good arc starting characteristic and the basic condition (2) must also be satisfied, according to which the transient phenomena should be terminated and transferred to a normal steady state within a sufficiently short period after the arc striking. That is, it is necessary that, after striking of the arc, both the wire feeding speed and the excited state of the welding voltage controlling the saturable reactor are varied to respective values corresponding to their normal steady state within a sufficiently short period.

The transition times to their normal settings are determined by their respective control circuits. If an excessively long time is required for transition from the initial wire feeding speed to the normal steady speed, the wire having been severed by fusion at the point of contact with the base metal can not be fed in matching relation with the extension of arc space and the arc is thereby temporarily extinguished. Also if an excessively long time is required for the welding voltage controlling the saturable reactor to be restored from its initially excited state to the normally excited state, the arc space will extend to an arc length corresponding to the state of initial excitation and finally the arc will be extinguished. If, on the contrary, the welding voltage controlling the saturable reactor is restored from its initially excited state to the normally excited state in an extremely short time, the extension of arc space will be too small so that the wire will again be caused to short circuit with the base metal and the arc can not continue. Thus, it is apparent that the transition must be completed within a sufficiently short period of a certain range.

Furthermore, at the time of actual welding after striking of an arc, it is well known that the welding wire frequently contacts the molten pool of a base material (electrical shorting). In general, such a tendency is high in welding with a low current and particularly high in welding using carbon dioxide for shielding.

On the other hand, when a power source means is used with which a short circuit current having a large rise rate is constantly supplied as required at the time of arc striking, a large short circuit current flows upon contact of the tip of the wire with the molten pool, which occurs frequently during welding, thereby causing an intense fusing and as a result the arc is rendered unstable and intense spattering occurs.

This means that the power source for the welding is not only required which is capable of supplying a sufficient short circuit current when the welding wire comes in contact with the base material but also, after striking an arc, it is capable of supplying a short-circuit current having a sufficiently small rise rate to avoid such detrimental phenomena as spattering which tends to occur due to frequent contact of the base material with the welding wire.

Accordingly, means which merely reduce an internal inductance or the inductance of a welding current circuit is not satisfactory for use.

As will be obvious from the foregoing explanation, both of the basic conditions (1) and (2) must simultaneously be satisfied in order to obtain a good arc starting characterstic for all ranges of the welding conditions including various values of wire diameter and welding current and for any shape of the wire tip. The arc welding equipment according to the present invention is so arranged as to satisfy both of the above-described basic conditions (1) and (2) and provides an extremely satisfactory arc starting characteristic under all ranges of welding conditions and for any shape of the wire tip.

Now, an embodiment of the arc welding equipment of the present invention will be described with reference to FIG. 6. Reference numeral 1 designates a power transformer; 2, main coils of a saturable reactor for obtaining a suitable welding voltage; 3, rectifiers; 4, a current detecting circuit interposed in the welding circuit; 5, a welding wire; 6, pieces of a base metal to be welded; 7, a conductive tip; 8, a control coil of the saturable reactor; 9, a circuit for changing over the exciting current for the control coil 8 of the saturable reactor (switching circuit); 10, an electric motor for feeding the wire 5 towards the base metal 6; and 11, a circuit for changing over the speed of electric motor 10 (switching circuit).

The arc welding device shown in FIG. 6 operates in the following manner. The control coil 8 of the saturable reactor is excited positive until the end of the wire 5 is brought into contact with the base metal 6. As soon as the wire 5 contacts the base metal 6, the current detecting circuit 4 delivers a signal to circuit 9 to actuate the exciting current change-over, and sufficient short circuit current $I_s$ is supplied, having a high rise rate $di/dt$ which is determined by a value of initial excitation $e_o$, time constant $t_1$ of the exciting circuit, working time lag $t_2$ of the switching circuit 9 and impedance $z$ of the welding current circuit.

After the arc has been struck, transition to the normal steady state is effected with a time lag $T_1$ which is likewise determined by $e_o$, $t_1$ and $t_2$. Further, until the tip of the wire 5 is brought into contact with the base metal 6, the wire 5 is fed at a slow initial speed $V_o$ which is necessary for providing a sufficiently slow variation rate of contact resistance with relation to time. As soon as the wire 5 is brought into contact with the base metal 6, the signal delivered from the current detecting circuit 4 to circuit 11 actuates the motor speed change over, and transition to the normal steady state is effected with a suitable time lag which is determined by the low initial speed $V_o$, working time lag $T_2$ of the switching circuit and rate of motor speed variation $dv/dt$.

Figure 6:
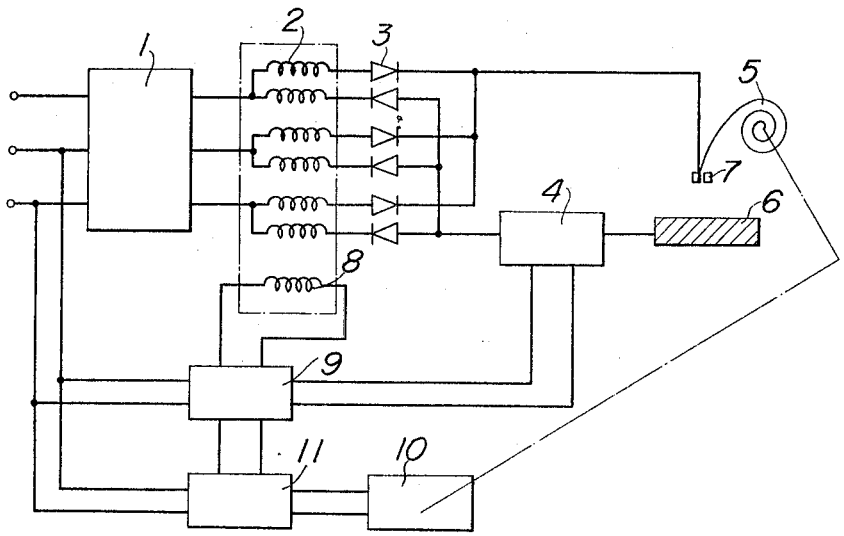
FIG. 6 is an electrical circuit diagram of an arc welding device embodying the present invention.

An important feature of the present invention resides in that the circuit as described with reference to FIG. 6 is used therein and the values of $di/dt$, $I_s$ and $T_1$ described above are suitably correlated with the values of $V_o$, $T_2$ and $dv/dt$ in order to obtain an optimum arc starting characteristic. According to results of experiments by the inventors, circuit conditions for obtaining such optimum arc starting characteristics are as follows:

$di/dt$: more than $50 \times 10^3$ amperes per second ($di/dt$ being a mean value of short circuit current rise rate in a period of 10 milliseconds after the initiation of short circuit)

$I_s$: more than 1000 amperes ($I_s$ being a peak value of short circuit current)

$T_1$: less than $120 \times 10^{-3}$ second ($T_1$ being a time lag until the normal steady state is reached after the initiation of short circuit, as shown in FIGS. 7, 8, 9 and 10)

$V_o$: less than 3 meters per minute ($V_o$ being an initial speed of the wire)

$T_2$: less than $20 \times 10^{-3}$ second ($T_2$ being a working time lag of the wire feeding speed switching circuit)

$dv/dt$: more than 0.8% per $10^{-3}$ seconds ($dv/dt$ being a mean value of rate of wire feeding speed variation in a period of 20 milliseconds after the speed change-over, provided that the normal steady wire feeding speed is 100%)

Figure 7:
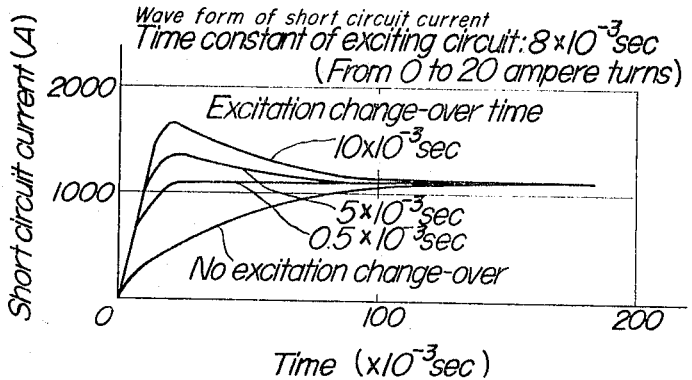
Figure 8:
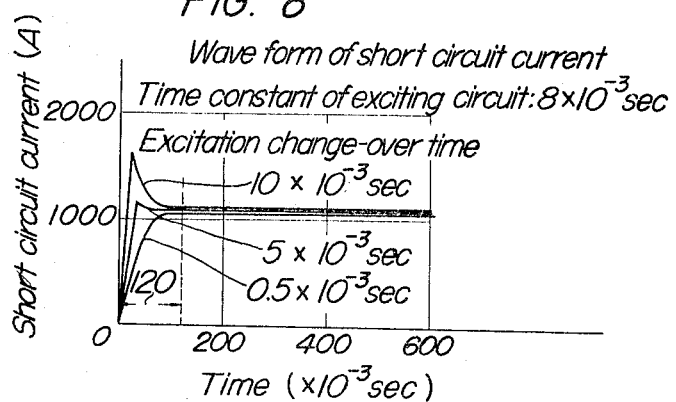
Figure 9:
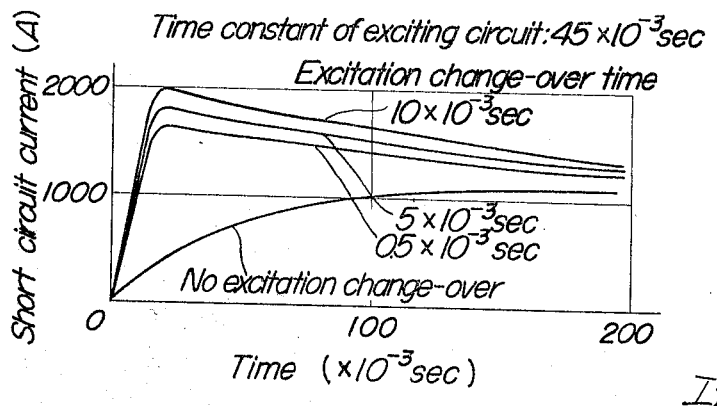

Experimental data for determining the values of the above-described circuit conditions are partly shown in the following figures:

$di/dt$: FIGS. 7 and 8
$I_s$: FIGS. 7 and 8
$T_1$: FIGS. 7, 8, 9 and 10
$V_o$: FIGS. 11 and 12
$T_2$: FIG. 13
$dv/dt$: FIG. 14

Figure 15:
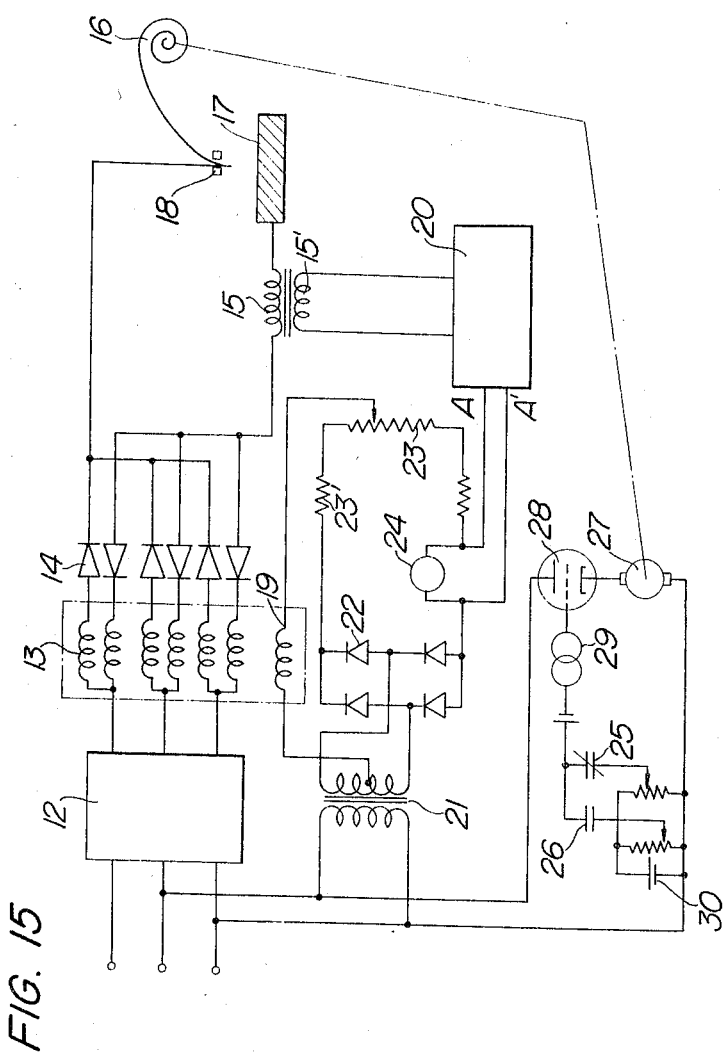
FIG. 15 is an electrical circuit diagram illustrative of another embodiment according to the present invention.

Another embodiment of the arc welding equipment of the present invention is shown in FIG. 15. In FIG. 15, reference numeral 12 designates a power transformer; 13, main coils of a saturable reactor; 14, rectifiers; 15, a smoothing series reactor; 15', a current detecting coil; 16, a welding wire; 17, pieces of a base metal; 18, a conductive tip; 19, a control coil of the saturable reactor; 20, a transistor switching circuit for switching the terminals A and A' to "on" from "off" with a suitable time lag $t_2$ in order to change over the direction of the exciting current for the saturable reactor control coil 19 to negative from positive; 21, an auxiliary transformer; 22, auxiliary rectifiers; 23, a resistance for adjusting the exciting current; 23', auxiliary resistance; 24, an electromagnetic relay for changing over the speed of wire feeding motor; 25, a normally closed contact of the electromagnetic relay 24; 26, a normally opened contact of the electromagnetic relay 24; 27, an electric motor for feeding the wire 16; 28, a thyratron for controlling the speed of the wire feeding motor 27; 29, a phase shifting circuit; and 30, a source of bias voltage for the thyratron 28.

The arc welding equipment with the arrangement as shown in FIG. 15 operates in the same manner as described with reference to the basic circuit as shown in FIG. 6. Or more precisely, the terminals A and A' are kept in their "off" state until the wire 16 is brought into contact with the base metal 17. The saturable reactor control coil 19 is excited in a manner that its ampere turn has a positive value $e_o$ and, as soon as the wire 16 contacts the base metal 17, a signal from the current detecting coil 15' actuates the transistor switching circuit 20 to switch the terminals A and A' to their "on" state with a proper time lag $t_2$ so that the state of excitation is changed over to negative from the previous positive.

The electromagnetic relay 24 is driven to its unexcited state from its previous excited state when the terminals A and A' are switched to their "on" state from the previous "off" state due to the contact between the wire 16 and the base metal 17. Thus, the contact 25 is driven to its "on" state from its "off" state while the contact 26 driven to its "off" state from the "on" state, and as a result the speed of the wire feeding motor 27 is changed over. The transition from the commencement of short circuit to the operation of the contacts 25 and 26 is effected with a proper time lag $T_2$. Preferred circuit conditions in the circuit of FIG. 15 are as follows:

Value of initial excitation $e_o$; +8 to +12 ampere turns.

Time constant $t_1$ of exciting circuit; $8 \times 10^{-3}$ second, when ampere turn is varied from 0 to 20 with the exciting circuit resistance of 6 ohms.

Working time lag $t_2$ of change-over circuit; $0.6 \times 10^{-3}$ second.

Rise rate of welding current $di/dt$; $90 \times 10^3$ amperes per second.

Peak value of short circuit current $I_s$; 1130 to 1690 amperes.

Transition time $T_1$; $100 \times 10^{-3}$ second.

Initial wire feeding speed $V_o$; 1.5 meters per minute.

Working time lag $T_2$ of change-over circuit; $15\times10^{-3}$ second.

Rate of motor speed variation $dv/dt$; 1.0% per $10^{-3}$ second.

Figure 16:
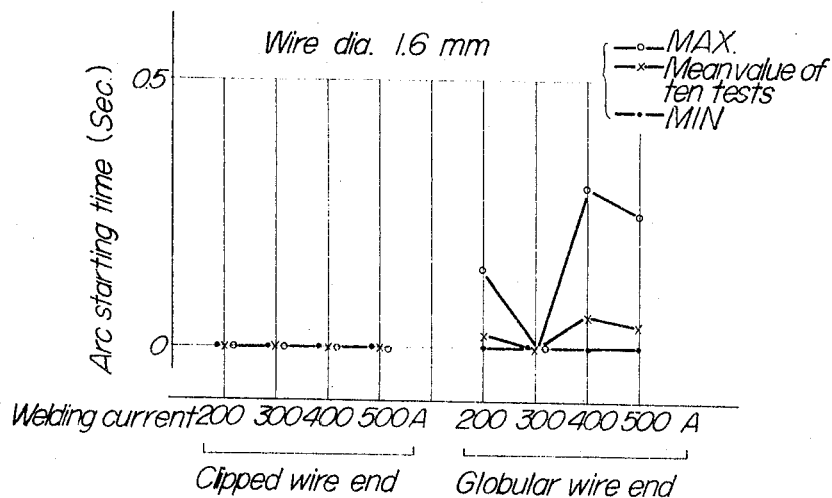
FIGS. 16 and 17 are graphic representations of an arc starting characteristic in the arc welding equipment of FIG. 15.
Figure 17:
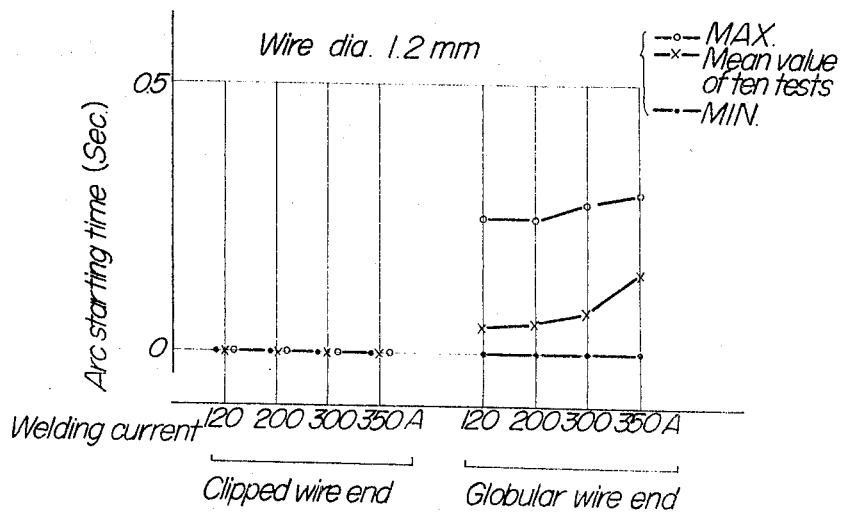

As a result of a series of arc starting tests with the above-described circuit, excellent characteristics as shown in FIGS. 16 and 17 could be obtained. The excellence of these characteristics is quite marked when compared with the prior characteristics shown in FIGS. 1 and 2.

What is claimed is:

1. An arc welding device for operation with a consumable electrode comprising welding power supply means operative to provide in the initial stage of welding at the time of striking an arc a welding current with a rise rate $di/dt$ (mean value in 10 milliseconds after initiation of short circuit) of more than $50\times10^3$ amperes per second and to supply a short circuit current with a peak value $I_s$ of more than 1000 amperes, said welding power supply means being restored to its normal steady operative state with a time lag $T_1$ of less than $120\times10^{-3}$ seconds and a rise rate $di/dt$ (mean value in 10 milliseconds after initiation of short circuit) of the welding current of less than $30\times10^3$ amperes per second after striking of an arc, and welding wire feeding means operative to give in the initial stage of welding a wire feeding speed $V_0$ of less than 3 meters per minute and restored to its normal steady operative state with a time lag $T_2$ of less than $20\times10^{-3}$ seconds after striking an arc to get a normal steady feeding speed, the change-over from the initial to the normal steady speed being effected at a speed variation rate $dv/dt$ of more than 0.8% per $10^{-3}$ second ($dv/dt$ being a mean value in 20 milliseconds after the change-over of speed assuming that the normal steady speed is 100%).

2. An arc welding device for operation with a consumable electrode comprising means for detecting short circuit current, a switching circuit operative in response to a signal from said detecting means to deliver an output signal, welding power supply means including a saturable reactor whose state of excitation is variable in response to the output signal from said switching circuit, and welding wire feeding means whose wire feeding speed is variable in response to the output signal from said switching circuit; said arc welding device being operative in a manner such that said welding power supply means provides in the initial stage of welding at the time of striking an arc a welding current with a rise rate $di/dt$ (mean value in 10 milliseconds after initiation of short circuit) of more than $50\times10^3$ amperes per second, supplies a short circuit current with a peak value $I_s$ of more than 1000 amperes and is restored to its normal steady operative state with a time lag $T_1$ of less than $120\times10^{-3}$ second after striking of an arc, and said welding wire feeding means gives in the initial stage of welding a wire feeding speed $V_0$ of less than 3 meters per minute and is restored to its normal steady operative state with a time lag $T_2$ of less than $20\times10^{-3}$ seconds and a rise rate $di/dt$ (mean value in 10 milliseconds after initiation of short circuit) of the welding current of less than $30\times10^3$ amperes per second after striking of an arc to get a normal steady feeding speed, the change-over from the initial to the normal steady speed being effected at a speed variation rate $dv/dt$ of more than 0.8% per $10^{-3}$ seconds ($dv/dt$ being a mean value in 20 milliseconds after the changeover of speed assuming that the normal steady speed is 100%).

References Cited by the Examiner

UNITED STATES PATENTS

| | | | |
|---|---|---|---|
| 2,806,127 | 9/1957 | Hackman et al. | 219—137 |
| 3,102,948 | 9/1963 | McCampbell et al. | 219—137 |
| 3,141,085 | 7/1964 | Manz | 219—130 |

RICHARD M. WOOD, *Primary Examiner.*